United States Patent [19]

Hinson et al.

[11] Patent Number: 4,850,834
[45] Date of Patent: Jul. 25, 1989

[54] RETREAD RING

[75] Inventors: Wilburn W. Hinson, Athens, Ga.; David D. Inman; Dennis A. Russell, both of Findlay, Ohio

[73] Assignee: The Hercules Tire and Rubber Company, Findlay, Ohio

[21] Appl. No.: 139,801

[22] Filed: Dec. 30, 1987

[51] Int. Cl.$^4$ .............................................. B29D 30/54
[52] U.S. Cl. ........................................ 425/19; 156/96; 156/394.1; 156/398; 156/909; 425/58
[58] Field of Search ............... 425/17, 19, 58; 156/96, 156/130.3, 394.1, 909, 398, 401

[56] References Cited

U.S. PATENT DOCUMENTS

| 3,184,794 | 5/1965 | Sherkin | 425/19 |
|---|---|---|---|
| 3,689,337 | 9/1972 | Schelkmann | 156/96 X |
| 3,793,116 | 2/1974 | Schelkmann | 425/19 X |
| 3,883,382 | 5/1975 | Pelletier | 156/96 |
| 3,886,028 | 5/1975 | Hindin et al. | 156/130.3 X |
| 4,309,234 | 1/1982 | Witherspoon | 156/96 |
| 4,545,750 | 10/1985 | Sarumaru | 425/58 X |
| 4,579,619 | 4/1986 | Symmes et al. | 156/96 X |
| 4,624,732 | 11/1986 | King | 156/394.1 |
| 4,626,300 | 12/1986 | Barefoot | 156/96 |

FOREIGN PATENT DOCUMENTS 153981 9/1985 European Pat. Off. ............... 425/17

Primary Examiner—Richard L. Chiesa
Attorney, Agent, or Firm—Pearne, Gordon, McCoy & Granger

[57] ABSTRACT

This invention relates to a retread curing ring apparatus for mounting on a tire retread assembly which comprises a tire carcass having a retread area, integral side walls with inner edges, a preformed tread strip positioned on the retread area, and a flexible envelope or bag surrounding the entire retread assembly. The retread curing ring apparatus is positioned adjacent to each side of the tire carcass. The curing ring apparatus comprises a circular body with a recess adjacent to its bottom edge and positioned in said recess a circular elastomeric gasket having a channel at its bottom edge for attachment to the curing ring. The gasket is prepared from a plastic or rubber material and comprises a plurality of circumferential ribs adjacent the bead of the tire carcass which enables the clamp assemblies mounted circumferentially on the curing ring to hold the curing ring and the tire assembly in an airtight engaged position during the retread process.

19 Claims, 4 Drawing Sheets a# RETREAD RING

BACKGROUND OF THE INVENTION

This invention relates to a method of retreading tires, and more particularly to a tire retreading curing ring apparatus.

In general, there are two methods of retreading a worn-out tire to make it suitable for continued use. The methods include retreading a tire in a standard retread mold or, alternatively, utilizing moldless retreading. For example, tires to be retreaded in molds are buffed and then covered with a layer of uncured rubber, and placed in a standard tire retread mold. The rubber is shaped to the desired tread pattern by applying pressure inside the tire and then heating the entire assembly until the uncured rubber is cured and bonded to the carcass.

In moldless retreading, on the other hand, the tire assembly is formed on a tire carcass. A tread strip is placed on the peripheral or circumferential surface of the carcass, and a binder material or gum is placed between the surface and the tread strip. The assembly is then placed in a flexible envelope and the prevulcanized tread strip is vulcanized onto the tire carcass. Normally, the tire is mounted on a rim prior to enclosing the assembly within the flexible envelope. This invention, however, is directed to a tire retread curing ring apparatus which avoids the need for mounting the tire carcass on a rim or the necessity for using an inner tube to shape the tire in an envelope-type of retreading process.

More specifically, heretofore, various apparatus have been devised to accomplish sealing the envelope which covers the entire tire assembly and the tire bead. In particular, U.S. Pat. No. 4,579,619 discloses the use of a rigid circular ring sized to fit adjacent the bead area of the tire. Mounted on the circular ring is a plurality of clamps having a pivoted arm positioned to engage the inner side of the bead of the tire. The clamps have a handle to move the pivot arm and force it against the tire bead, thereby drawing the ring against the envelope on the outer side of the bead. Once the tire assembly has been prepared for recapping, the circular rings are placed in position on the tire assembly and the clamps are operated to the closed position for sealing engagement. The tire assembly, with the ring apparatus attached, is placed in a chamber to complete the recapping process under increased temperatures and pressures. One of the deficiencies of this apparatus, however, is that the mechanical clamps do not always provide pressure sufficient to seal the envelope of the tire assembly against the side walls or beads of the tire to prevent gas leakage during recapping.

In accordance with this invention, a specially designed elastomeric gasket is positioned between the tire bead and the ring assembly which, together with positioning of the clamps, vastly improves the seal at the point of contact and avoids any leakage during the recapping process. To obtain maximum sealing, the clamps should be in a position such that the vertical axis of the clamp rod is aligned with the vertical axis of the clamp arm and a gasket. Preferably, the gasket has a hollow portion which makes it more resilient in order to more evenly distribute forces and seal the circular rings, the envelope, and the tire bead. Circumferential ribs on the gasket further enable the clamp arm to be pivoted against the tire bead and the gasket to form a tight seal, and thereby prevent any leakage of gas or air during the recapping process.

SUMMARY OF THE INVENTION

A retreading curing ring apparatus of the present invention is positioned on each side of a tire retread assembly, which includes a tire carcass, an uncured rubber layer, a precured tread stock, and an elastomeric bag or envelope. Each curing ring apparatus is clamped to the end or bead area of the tire retread assembly, forming a seal between the curing ring body member, the inner edges of the flexible bag or envelope, and the ends of the side wall of the tire carcass.

More specifically, in accordance with this invention, the retreading curing ring apparatus includes a circular body member having a recess defined adjacent an edge. A circular elastomeric gasket, which preferably has a plurality of circumferential ribs or grooves on one side, is positioned within the recess and a plurality of clamping assemblies are mounted circumferentially spaced on the circular body member. Each of the clamps includes a clamping arm movable between an open and closed position. Each of the clamping arms is positioned opposite the circular elastomeric gasket when the arm is in the closed position. When the clamping arm is in the closed position, the arm holds the body member, the tire side wall, and the flexible envelope in an engaged or airtight sealed position.

In one of the preferred embodiments of this invention, the clamping assemblies comprise a spring means operatively attached to each clamping arm to hold the arm against the tire side walls and the circular elastomeric gasket. The clamps are preferably positioned on the ring such that the vertical axis of the clamp rod and the arm is aligned with the hollow or void of the gasket to exert maximum pressure on the tire bead and the gasket. Preferably, the gasket has a plurality of ribs facing the tire assembly to help hold the tire bead and the envelope in a non-slip sealed position during the curing process.

DESCRIPTION OF THE PREFERRED EMBODIMENTS

Figure 1:
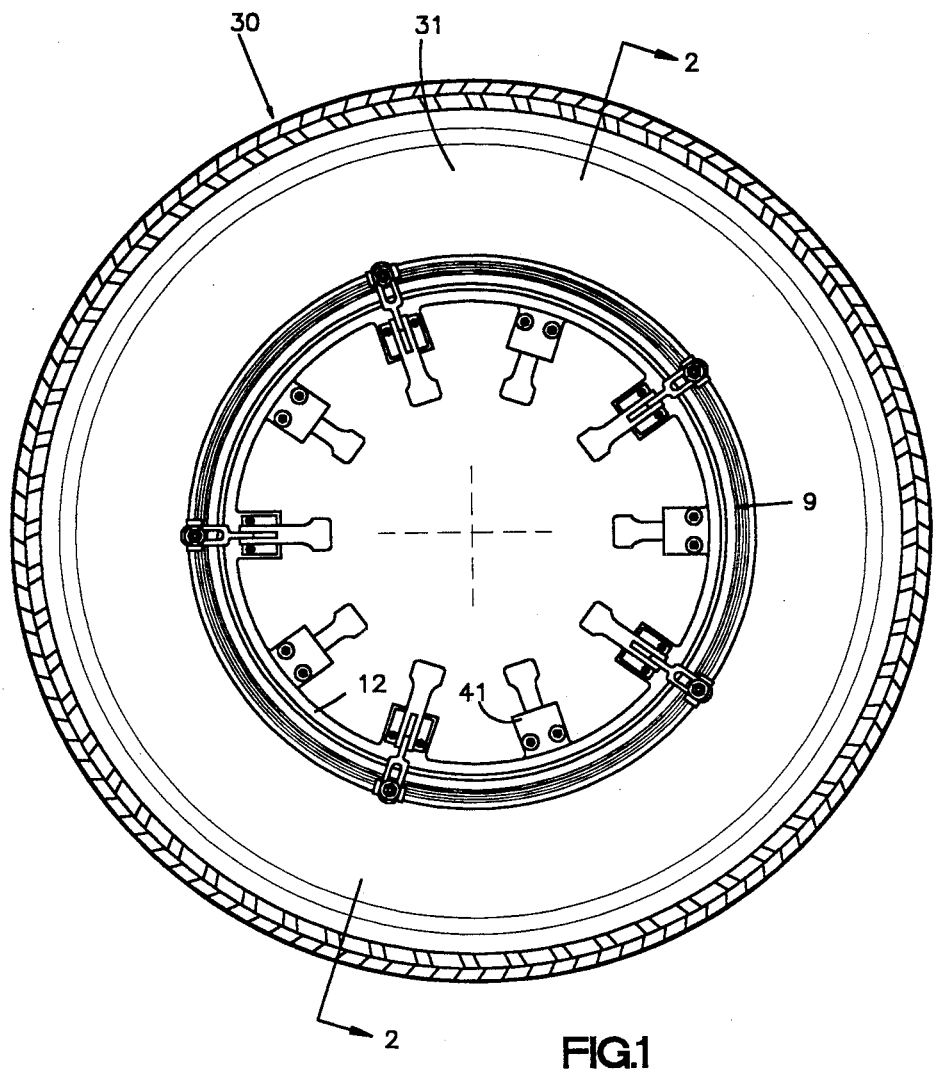
FIG. 1 is a fragmentary plan view of a tire retread assembly having a retread ring apparatus positioned on each side of the tire retread assembly, as shown in FIG. 2.
Figure 2:
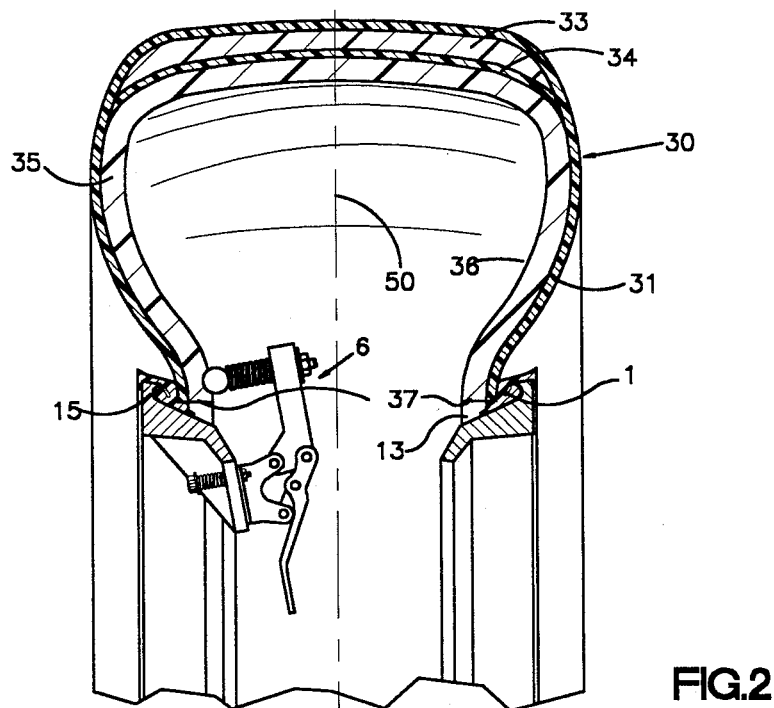
FIG. 2 is a fragmentary, cross-sectional view, taken along the line 2—2 of FIG. 1.

As shown in FIG. 1, the retread curing ring apparatus in accordance with this invention is generally shown in the drawings by reference numeral 9. Referring specifically to FIGS. 1 and 2, the tire retreading assembly 30 includes a premolded tread strip 33, an intermediate gum layer 34, and a tire carcass 35. The tire carcass 35 has integral side walls 36 extending downwardly and terminating at a circular bead 37. The tire retreading assembly 30 includes an outer flexible, elastomeric envelope or bag 31 extending downward to the tire beads 37.

Figure 3:
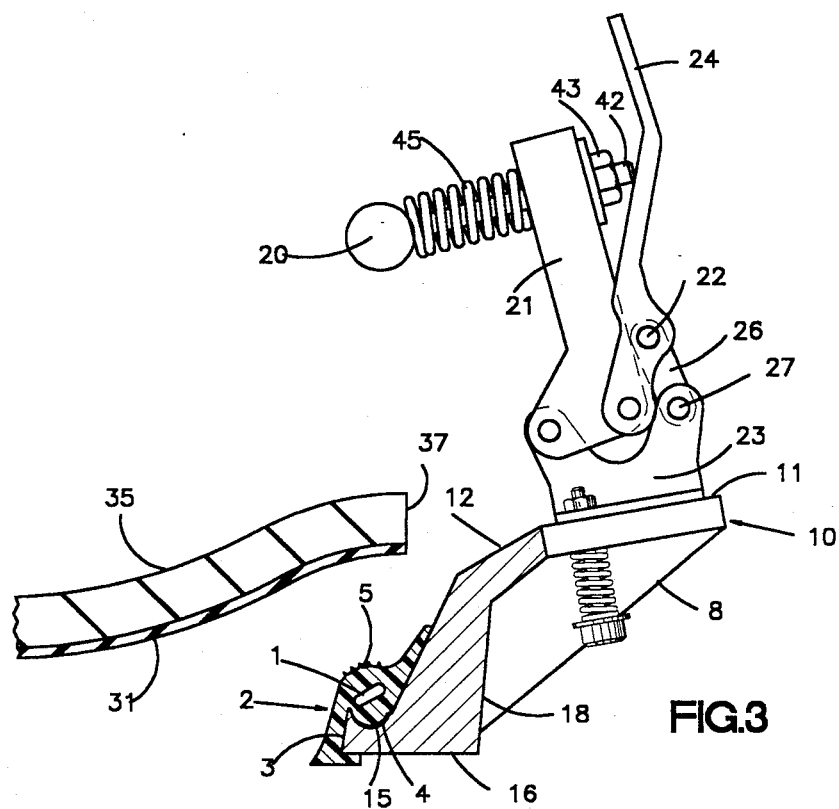
FIG. 3 is a view similar to FIG. 4, showing the clamping assembly in its open position.
Figure 4:
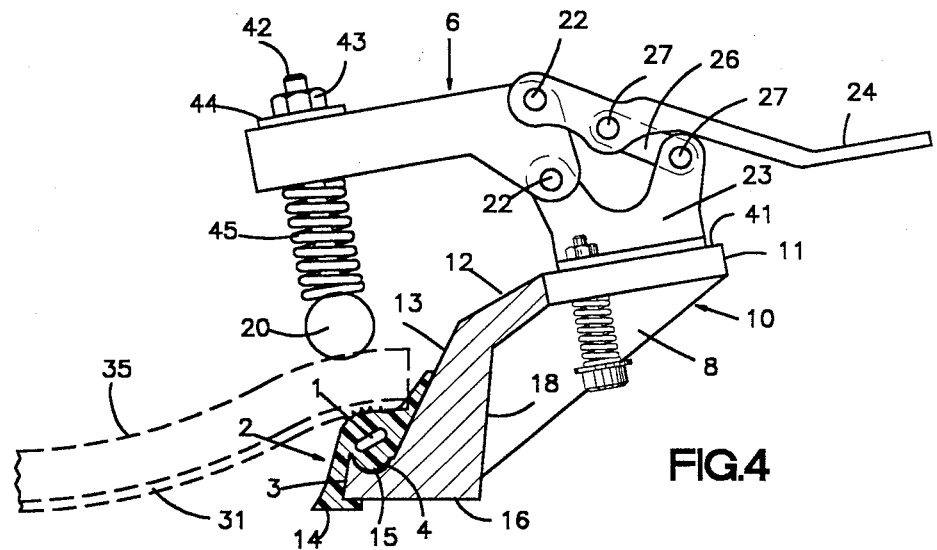
FIG. 4 is a view similar to FIG. 3, showing the clamping assembly in the closed position with a tire side wall and elastomeric envelope being moved downward against a circular hollow gasket.

In general, as shown in FIGS. 3 and 4, the curing ring apparatus 9 includes a circular body member 8 with a plurality of the clamping assemblies 6, e.g., four or five clamps per side manufactured under Model No. 225U, mounted at circumferentially spaced locations on the circular body member 8. The clamping assemblies 6 include a base member 11 with an angular guide projection or top edge 12 defining an outer vertical guide surface 13, a bottom edge 16, a peripheral inner surface 18, and a lip 17. Each clamping assembly 6 includes a clamping arm 20 movable between an open and closed position. The clamping arm 20 is adjustably mounted to a bifurcated support 21 which is pivotally attached by pivot pins 22 to the base support 23. The base support 23 is mounted to the base member 11. A clamp handle 24 is pivotally connected to the bifurcated support 21 and to a link 26. The link 26 is pivotally mounted by pivot pins 27 to the base support 23. The base support 23 is attached to the base member 11 with two or more, e.g., four, threaded bolts 38 and a nut 39. Each bolt 38 contains spring means, e.g., a coil spring 40 for adjusting the tension and position of the clamping assembly 6 against the tire bead 37 and gasket 2 in the clamping ring 10. The coil springs 40 under the clamping assembly 6 are preferably of stainless steel with an outside diameter of 0.686, left-hand wound, squared and ground to a length of 1.406 inches, e.g., about six coils.

More specifically, referring to FIG. 4, the circular body member 8 is generally of metal such as an aluminum alloy, and includes a bottom edge 16, a guide projection or top edge 12, a peripheral inner surface 18, and an outer peripheral edge or vertical guide surface 13, said peripheral edge guide surface 13 having a circumferential recess 15 adjacent the bottom edge 16 and a lip 17.

As shown in FIG. 2, when the tire retread assembly 30 is positioned relative to the two opposed curing ring apparatus 9, the guide surfaces 13 are contacted by the inner edge or bead 37 of the tire carcass 35 to ensure that the carcass is concentrically aligned with the circular body member 8.

In accordance with this invention, as shown at FIGS. 3 and 4, an elastomeric hollow gasket 2 is positioned within or mechanically attached to the circumferential recess 15 of the circular body member 8 of the clamping assembly 6. The elastomeric gasket 2 comprises a hollow or has a void 1 and a circumferential channel 3 adjacent its bottom edge 14 for mechanically attaching said gasket to a lip 17 on the body 8 of the clamping ring 10. An annular surface or rib 4 adjacent said circumferential channel 3 is positioned into the circular recess 15 of the body 8 of the clamping ring 10. On the opposite side of the annular surface or rib 4 of the gasket 2, a plurality of angularly downwardly spaced grooves or ribs 5, e.g., three to six ribs, provide a non-slip tight seal between the elastomeric bag 31 and the side walls 36 of the tire carcass 35.

In a preferred embodiment, as shown in FIG. 4, the elastomeric gasket 2 has a void or hollow 1 in approximately the center thereof to improve the resiliency of the gasket when the side wall 36 and the tire bead 37 are positioned and held against the gasket 2 by the clamping arm 20. The hollow gasket has greatly improved the sealing ability and consistency of the assembly.

Figure 7:
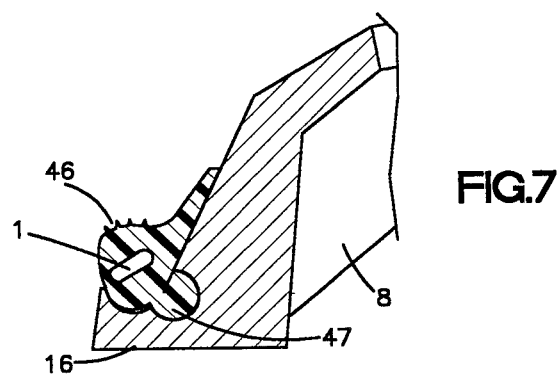
FIG. 7 is a fragmentary, cross-sectional view of the circular body member of the curing ring apparatus, with an alternate embodiment of the hollow elastomeric gasket mechanically attached to the circular body member.

Referring to FIG. 7, a variation of an elastomeric gasket 46 is shown mechanically attached to the circular body member 8 by force fitting a circumferential geometric extension or rib 48 of the elastomeric gasket 46 into the circumferential annular recess 47 of the body member 8. Specifically, the gasket 46 comprises a circumferential rounded or other geometrically-shaped extension or rib 48 with a hollow or void 1 near the center of the gasket and a plurality, e.g., three to six, of spaced grooves or ribs 5 on the opposite side of said extension 48 adjacent to the tire bead 37 and the elastomeric bag 31. The elastomeric gaskets can be prepared from various heat-resistant rubbery materials including synthetic plastics such as polymeric materials derived from ethylene, propylene and dine monomers. e.g., butadiene. These polymers are commercially available and are useful for preparing the elastomeric gasket for purposes of this invention.

The circular body member 8 includes a plurality of integral platforms 41 circumferentially spaced and extending inwardly at an angle from the top edge 12 of the circular body member 8.

Referring to FIG. 2, the platforms 41 are angularly positioned such that the top edge or guide projection 12 defines angle A of about 45° with respect to the central plane line 50 of the tire retread assembly 30. The vertical guide surface 13 forms angle B of about 15° with respect to horizontal plane line 51 of the tire retread assembly 30 when said horizontal line 51 is substantially parallel to the tire bead 37 and at right angles to the central plane line 50.

Figure 5:
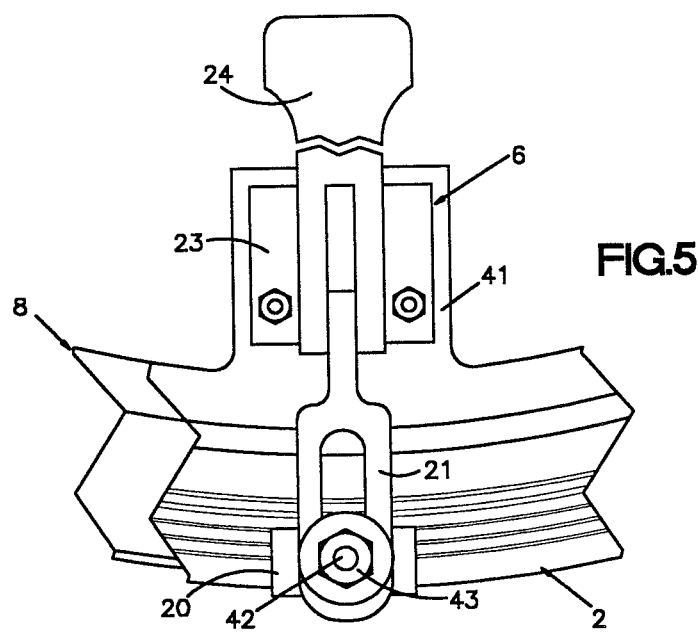
FIG. 5 is a top view of FIG. 6 showing the clamping assembly and the clamping ring apparatus of FIG. 6.
Figure 6:
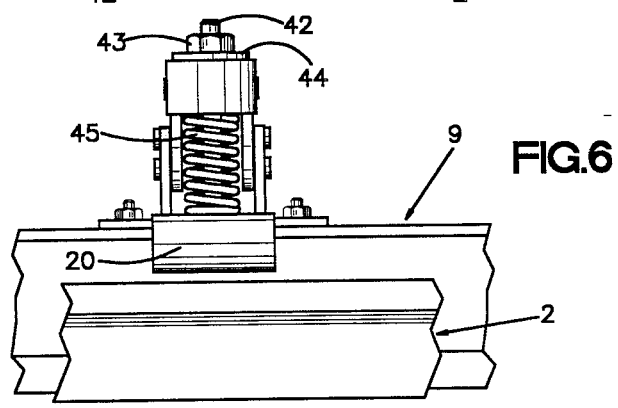
FIG. 6 is a front view of the clamping assembly including a spring means.

As shown in FIG. 1, there are five evenly spaced platforms 41 extending inward at an angle from the top edge 12 of each of the curing ring apparatus 9. As shown in FIGS. 5 and 6, on each of said platforms 41 is mounted a clamp assembly 6. A plurality of clamping assemblies 6 are mounted at circumferentially spaced positions defined by the platforms 41 of the circular body member 8. As shown in FIGS. 3 and 4. and as previously discussed, each of the clamp assemblies 6 includes a base support 23, a link 26, a bifurcated handle 24, and a bifurcated support or lever arm 21.

As shown in FIGS. 5 and 6, the lever arm 21 is bifurcated and receives a threaded clamp rod 42, an adjusting nut 43, and a washer 44 which are positioned on the upper end of the clamp rod 42 above the lever arm 21. The clamping arm 20 is attached to the lower end of the threaded clamp rod 42. More specifically, as shown in FIGS. 3 and 4, by adjusting the nut 43, the radial position and throw of the clamp rod 42 and clamp arm 20, and thus the force applied, may be adjusted. Preferably, the radial position of the rod 42 is adjusted such that the clamping arm 20 is directly opposite the center of the elastomeric gasket 2 and the vertical axis of the clamp arm 20 and the clamp rod 42 is aligned with the center of the hollow 1 of the gasket 2 when the clamping assembly is in its closed position, as shown by the center line 52 in FIG. 4. The spring means 45 is operatively attached to the clamping rod 42 and clamping arm 20 for positioning the arm 20 against the elastomeric gasket 2. Specifically, the spring means 45 is substantially the same as coil spring 40, except that coil spring 45 is squared and ground to a length of 0.968 inch and has 4.5 rails.

The clamping assembly 6 is movable between an open position, as shown in FIG. 3, and a closed position, as shown in FIG. 4. The handle 24 is engaged and moved downwardly to sandwich the envelope 31 and the tire ends or bead 37 between the elastomeric, hollow gasket 2 and the clamping arm 20 to provide an airtight seal. The tire bead 37 and the envelope 31 are shown in the engaged position against the ribbed hollow gasket 2 in FIG. 4. After all of the clamping assemblies 6 have been moved to the closed position, the tire assembly and the curing ring apparatus are placed in an autoclave, where curing of the intermediate rubber layer or gum layer 34 forms an adhesion between the tire carcass 35 and the precured strip 33.

Although the preferred embodiments of this invention have been shown and described, it should be understood that various modifications and rearrangements of the parts may be resorted to without departing from the scope of the invention as disclosed and claimed herein.

What is claimed is:

1. A retread curing ring apparatus for mounting on a tire retread assembly, which comprises a tire carcass having a retread area, an integral side wall having a bead at its inner edge, a preformed tread strip positioned on said retread area and a flexible envelope surrounding said tread strip and said side walls and extending downwardly toward said bead, said retread curing ring apparatus positioned adjacent to one of said side walls for securing said envelope to the tire carcass for curing;

said curing ring apparatus comprising a circular body member, a guide surface along the outer periphery of the curing ring; and a circular gasket having:

a first section for operatively engaging the flexible envelope and side wall of the tire carcass;

a second section mechanically held on the curing ring; and a third section having a flattened section extending over a part of the guide surface for engagement of the bead at the inner edge; and a plurality of clamping assemblies mounted circumferentially on said body member, each of said clamping assemblies comprising a clamping arm movable between open and closed positions, said clamping arm being opposite said gasket and positioned on an axis which passes through the side wall, the flexible envelope, the gasket and the ring when said arm is closed so that the side wall and the bead of the carcass engage the first section and the third section of the gasket over a relatively large area, thereby holding said body member and the tire bead and envelope in an engaged, sealed position.

2. The retread curing ring apparatus of claim 1, further characterized in that each of said clamping assemblies includes a spring means operatively attached to said clamping arm to force the clamping arm toward said gasket.

3. The retread curing ring apparatus of claim 2, further characterized as comprising guide means on said body member for concentrically aligning the tire carcass, said guide means having a guide surface on the body member extending away from said recess.

4. The retread curing ring apparatus of claim 2, further characterized in that the clamping assembly comprises a movable lever arm and said spring means includes a rod mounted for movement on said lever arm, said clamping arm being mounted on the end of said rod with said spring surrounding said rod.

5. The retread curing ring apparatus of claim 4, further characterized in that the ring apparatus comprises a means for adjusting the radial position of said clamping arm.

6. The retread curing ring apparatus of claim 4, further characterized in that the movable lever arm has means for receiving the said rod, said rod being threaded with an adjusting nut positioned on said threaded portion adjacent said lever arm.

7. The retread curing ring apparatus of claim 1, further characterized in that said gasket second section comprises a circumferential channel for locking onto the circular body member.

8. A curing ring apparatus for retreading tires having a tire carcass having a retread area, an integral side wall having a bead at its inner edge, the curing ring comprising a substantially circular body member for receiving a tire bead, a guide surface along the outer periphery of the curing ring, a recess defined by the body member near its edge, and a hollow, circular, elastomeric gasket positioned in said recess, said gasket further having circumferential ribs positioned to operatively engage an envelope and tire side wall forming a tight seal, and a plurality of clamps attached to the circular body member positioned opposite the gasket on the other side of the tire carcass to hold the curing ring body member, the tire, and the envelope in an engaged position.

9. The circular body member of claim 8, further characterized in that the said body member has a circumferential projection and the gasket has a complementary channel fitting onto said projection.

10. The curing apparatus of claim 8, further characterized in that said circular body member has a circumferential channel and the gasket has means fitting into said channel.

11. The curing ring apparatus of claim 8, further characterized in that the circular body member has a plurality of circumferentially spaced-apart clamps secured to the circular ring for clamping said ring against the side wall and bead of the tire carcass forming an annular airtight seal.

12. The curing ring apparatus of claim 11, further characterized in that the clamps have a pivoted arm and a spring-loaded clamp arm on the inner side of the tire bead.

13. The curing ring apparatus of claim 12, further characterized in that the clamp arm engages the tire bead at about a 90-degree angle.

14. The curing ring apparatus of claim 8, further characterized in that the gasket has a flattened circular area extending along the guide surface.

15. The curing ring apparatus of claim 8, further characterized in that a guide projection on said body member of the curing ring is at an angle of about 45 degrees with respect to the central plane line of the tire retread assembly.

16. The curing ring apparatus of claim 8, further characterized in that the guide surface of said body member of the curing ring is at an angle of about 15 degrees with respect to the horizontal plane line of the tire retread assembly.

17. A tire retread assembly comprising a tire carcass having a retread area and integral side walls with inner edges, a preformed tread strip positioned on said retread area, and a flexible envelope surrounding said tread strip and said side walls and extending downwardly toward a bead at the inner edges; retread curing rings positioned adjacent said side walls to secure the envelope to the tire carcass, said curing rings each comprising a circular body member, a guide surface on the body member, a recess defined by said body member adjacent to its edge, a circular gasket having a first section for operatively engaging the flexible envelope, a second section mechanically held on the curing ring, and a third section having a flattened section extending over a part of the guide surface for engagement of the bead at the inner edge, and a plurality of clamping assemblies circumferentially mounted on said body member, each of said clamping assemblies comprising a clamping arm opposite said circular gasket when said arm is closed, so that the side wall and the bead engage the first section and the third section over a relatively large area, thereby holding the body member and the tire side walls and envelope in a sealed airtight position.

18. The tire assembly of claim 17, further characterized in that the clamping assemblies are mounted on said body member at an angle of about 45 degrees with respect to a peripheral inner surface of said body member.

19. The tire assembly of claim 17, wherein the first section is hollow and has circumferential ribs and the second section has a rib which fits in the recess.

* * * * *